(12) United States Patent
Tieman

(10) Patent No.: US 12,240,742 B1
(45) Date of Patent: Mar. 4, 2025

(54) INSTALLATION AND REMOVAL TOOL FOR A WALL-MOUNTABLE OBJECT AND METHOD

(71) Applicant: Michael Anthony Tieman, Las Vegas, NV (US)

(72) Inventor: Michael Anthony Tieman, Las Vegas, NV (US)

( * ) Notice: Subject to any disclaimer, the term of this patent is extended or adjusted under 35 U.S.C. 154(b) by 0 days.

(21) Appl. No.: 18/640,595

(22) Filed: Apr. 19, 2024

(51) Int. Cl.
*B66D 3/26* (2006.01)
*F16M 13/02* (2006.01)

(52) U.S. Cl.
CPC .......... *B66D 3/26* (2013.01); *B66D 2700/025* (2013.01); *F16M 13/02* (2013.01)

(58) Field of Classification Search
CPC ..... B66D 3/26; B66D 2700/025; F16M 13/02
See application file for complete search history.

(56) References Cited

U.S. PATENT DOCUMENTS

| 2012/0018610 A1* | 1/2012 | Kempf | B66D 3/18 248/329 |
| 2022/0238086 A1* | 7/2022 | Bedson | G10D 13/16 |

* cited by examiner

*Primary Examiner* — Rick K Chang
(74) *Attorney, Agent, or Firm* — Ted Masters

(57) ABSTRACT

An installation and removal tool for connecting a wall-mountable object to a wall mount on a wall includes a holder which is configured to receive the wall-mountable object, a first cable spool connected to the holder, a first cable windable around the first cable spool, the first cable having a distal end, a first connector disposed at the distal end of the first cable, the first connector removably connectable to the wall mount. And a second cable spool connected to the holder, a second cable windable around the second cable spool, the second cable having a distal end, a second connector disposed at the distal end of the second cable; the second connector removably connectable to the wall mount. A rotary drive is connected to the holder. A first axle is connected between the rotary drive and the first cable spool. A second axle is connected between the rotary drive and the second cable spool.

17 Claims, 14 Drawing Sheets

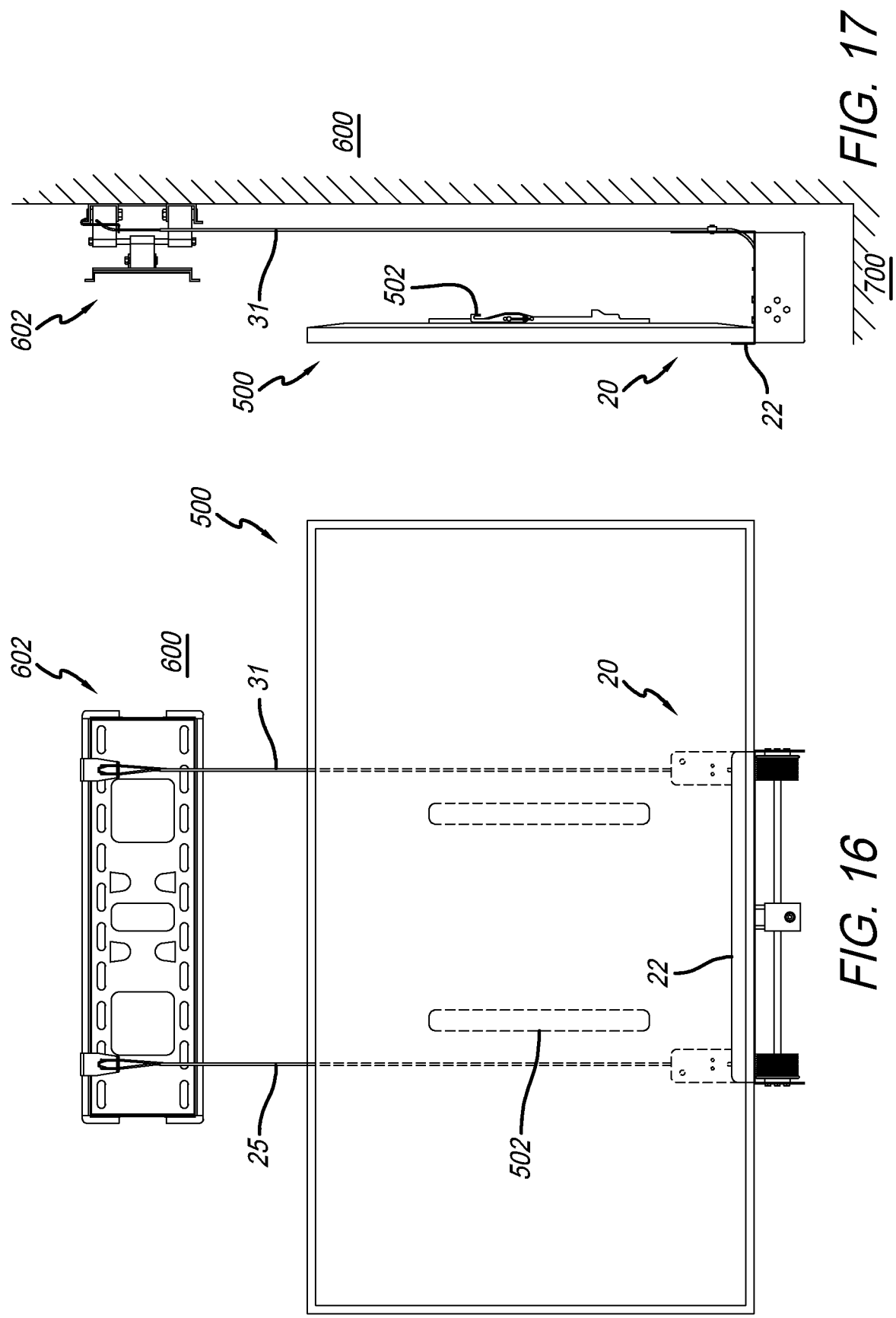

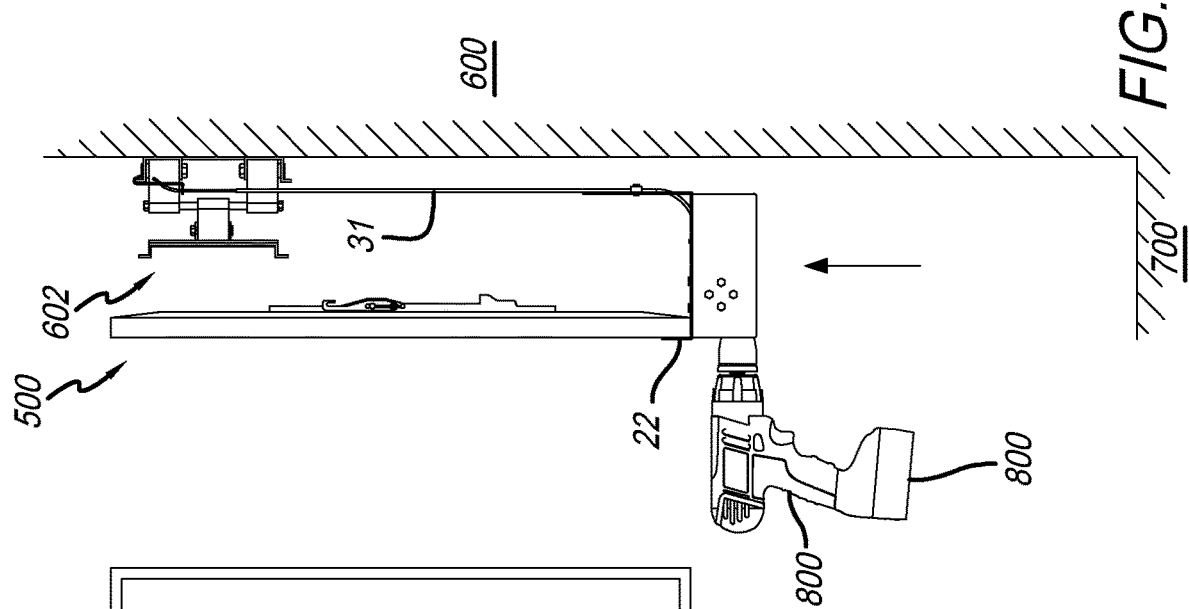
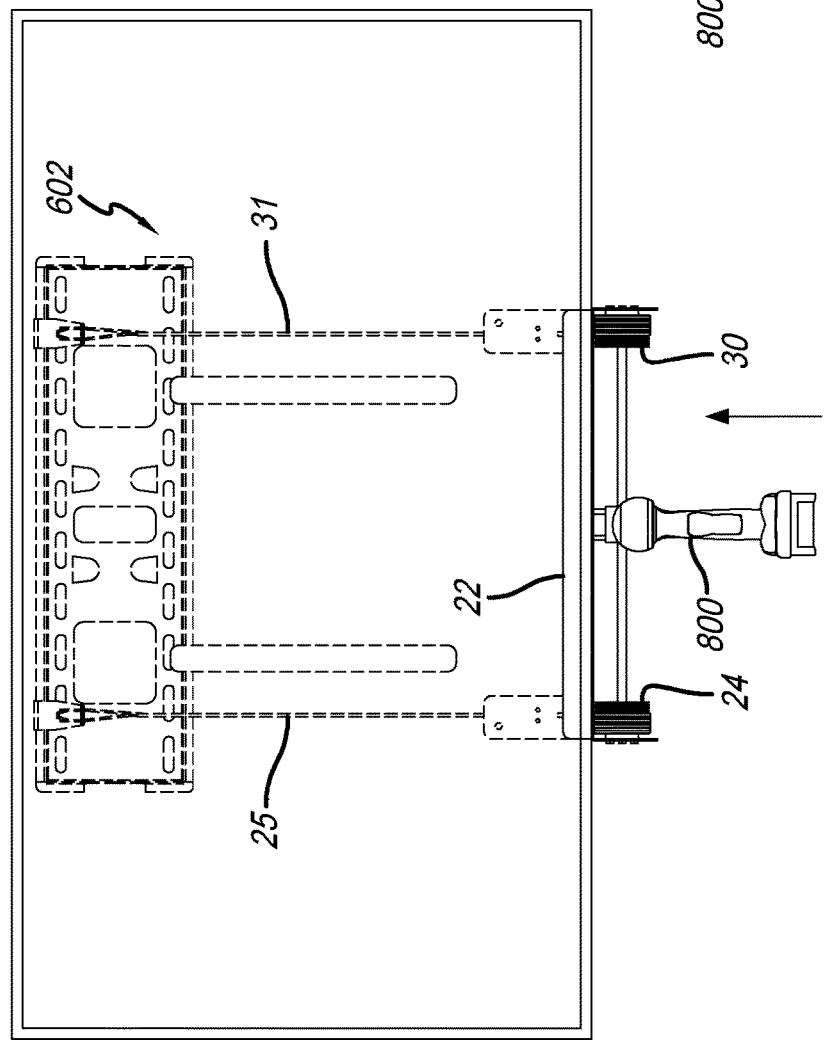

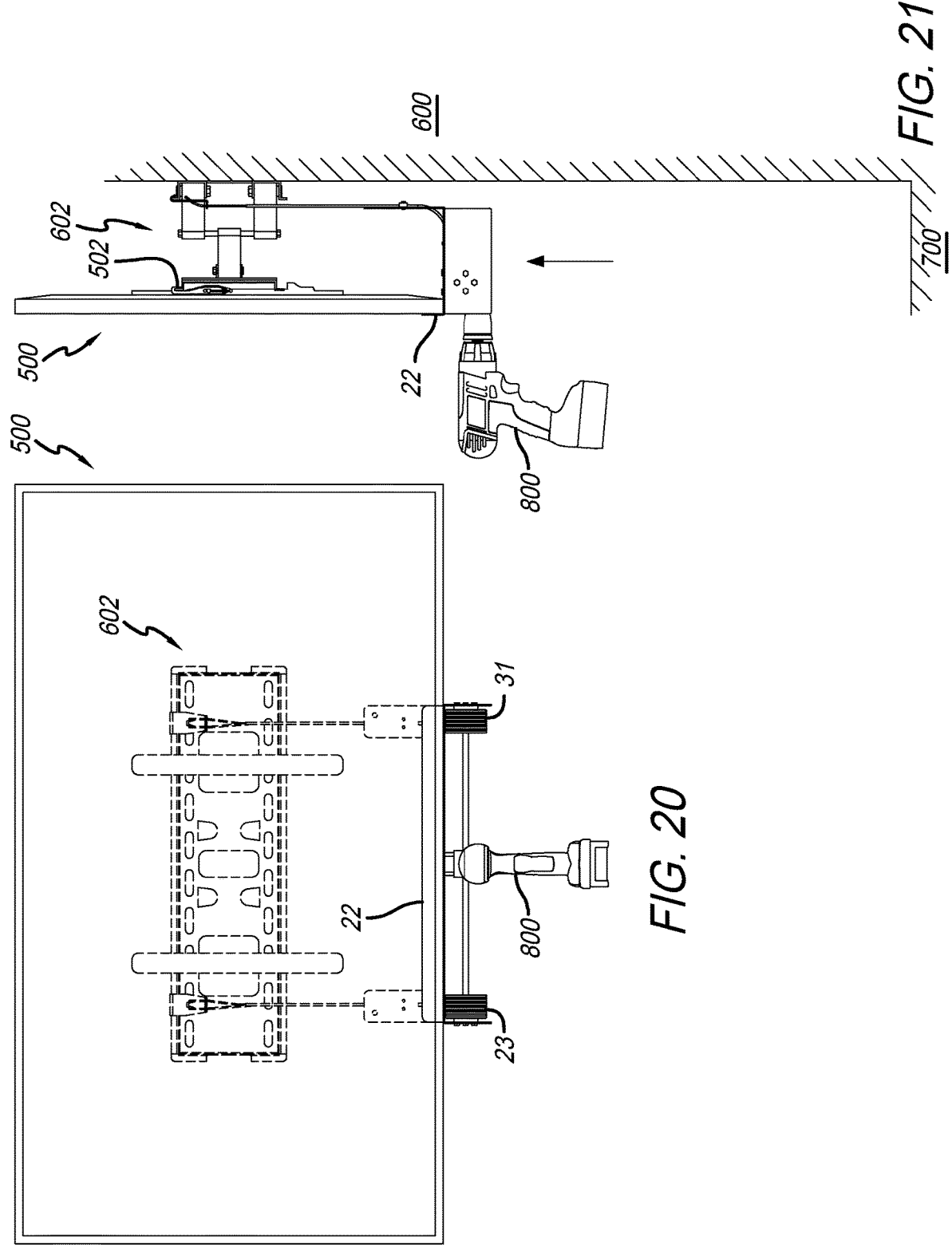

INSTALLATION AND REMOVAL TOOL FOR A WALL-MOUNTABLE OBJECT AND METHOD

CROSS REFERENCE TO RELATED APPLICATION

None.

TECHNICAL FIELD

The present invention pertains generally to wall-mountable objects, and more particularly to an installation and removal tool for facilitating the connection of the wall-mountable object to a wall mount disposed on a wall.

BACKGROUND OF THE INVENTION

Large wall-mountable objects can be generally flat such as electronic wall-mountable objects, pictures, mirrors and the like, but can also be of other shapes. The wall-mountable objects are connected to a wall mount such as a nail(s), screw(s), or a specialized mounting fixture which is attached to the wall and holds the wall-mountable object in an elevated positon on the wall. To effect the installation, the wall-mountable object must be lifted up vertically to align with the wall mount, and then must be connected to the wall mount. Because of the weight and bulk of many wall-mountable objects, this lifting process presents a problem for a single person to implement.

BRIEF SUMMARY OF THE INVENTION

The present invention is directed to an installation and removal tool for a wall-mountable object which facilitates the installation or removal of the object. The tool makes it possible for a single person to effect an installation or removal. When installed the wall-mountable object hangs from a wall mount which is connected to a wall. To effect the installation, the wall-mountable object is loaded into the installation tool. The wall-mountable object is then raised so that it's wall-facing connector aligns with the wall mount, and it can be connected thereto. In an embodiment the installation tool is connected to the wall mount in order to raise the wall-mountable object. In an embodiment, the raising is accomplished by a rotary device using a power tool such as a drill motor, or other rotational device. By using the installation tool, a single person can safely and easily connect the wall-mountable object to the wall mount in a short period of time.

In accordance with an embodiment, an installation and removal tool for connecting a wall-mountable object to a wall mount connected to a wall includes a holder which is configured to receive the wall-mountable object, a first cable spool is connected to the holder, a first cable is windable around the first cable spool, the first cable having a distal end, a first connector is disposed at the distal end of the first cable, the first connector is removably connectable to the wall mount. The installation tool further includes a second cable spool connected to the holder, a second cable is windable around the second cable spool, the second cable having a distal end, a second connector is disposed at the distal end of the second cable; the second connector is removably connectable to the wall mount. A rotary drive is connected to the holder. A first axle is connected between the rotary drive and the first cable spool, and a second axle is connected between the rotary drive and the second cable spool.

In accordance with another embodiment, a first tubular cable guide is connected to the holder, the first cable is received by the first tubular cable guide. A second tubular cable guide is connected to the holder, the second cable is received by the second tubular cable guide.

In accordance with another embodiment, the first and second tubular cable guides are both curved.

In accordance with another embodiment, the first tubular cable guide has a first proximal end, the first proximal end is connected to the holder adjacent the first cable spool, the first proximal end includes a first flexible nipple. The second tubular cable guide has a second proximal end, the second proximal end is connected to the holder adjacent the second cable spool, the second proximal end includes a second flexible nipple.

In accordance with another embodiment, the rotary drive includes a worm gear which engages both the first axle and the second axle via a worm wheel.

In accordance with another embodiment, the first connector includes both a first hook and a first loop, and the second connector includes both a second hook and a second loop.

In accordance with another embodiment, the holder has a bed. The bed has a first aperture which is disposed adjacent the first cable spool and allows visual access thereof. The bed has a second aperture, the which is disposed adjacent the second cable spool and allows visual access thereof.

In accordance with another embodiment, the bed includes a first lower axial edge which borders the first aperture. The first cable spool includes a first helical groove which receives the first cable, the first helical groove includes a first plurality of alternating peaks and valleys. The first lower axial edge is positioned with respect to the first cable spool so that the first cable is prevented from axially moving across a peak and into an adjacent valley;

In accordance with another embodiment, the bed includes a second lower axial edge which borders the second aperture; The second cable spool includes a second helical groove which receives the second cable, the second helical groove includes a second plurality of alternating peaks and valleys. The second lower axial edge is positioned with respect to the second cable spool so that the second cable is prevented from axially moving across a peak and into an adjacent valley.

Other embodiments, in addition to the embodiments enumerated above, will become apparent from the following detailed description, taken in conjunction with the accompanying drawings, which illustrate, by way of example, the principles of the installation and removal tool for a wall-mountable object and method of use.

BRIEF DESCRIPTION OF THE DRAWINGS

FIG. 16 is a reduced front elevation view of the installation and removal tool with wall-mountable object inserted in the holder;

FIG. 17 is a side elevation view of FIG. 16;

FIG. 18 is a reduced front elevation view of the installation and removal tool with wall-mountable object raised to a midway position;

FIG. 19 is a side elevation view of FIG. 18;

FIG. 20 is a reduced front elevation view of the installation and removal tool with wall-mountable object raised to a fully elevated position and connected to the wall mount; and, FIG. 21 is a side elevation view of FIG. 20.

DETAILED DESCRIPTION OF THE INVENTION

Figure 1:
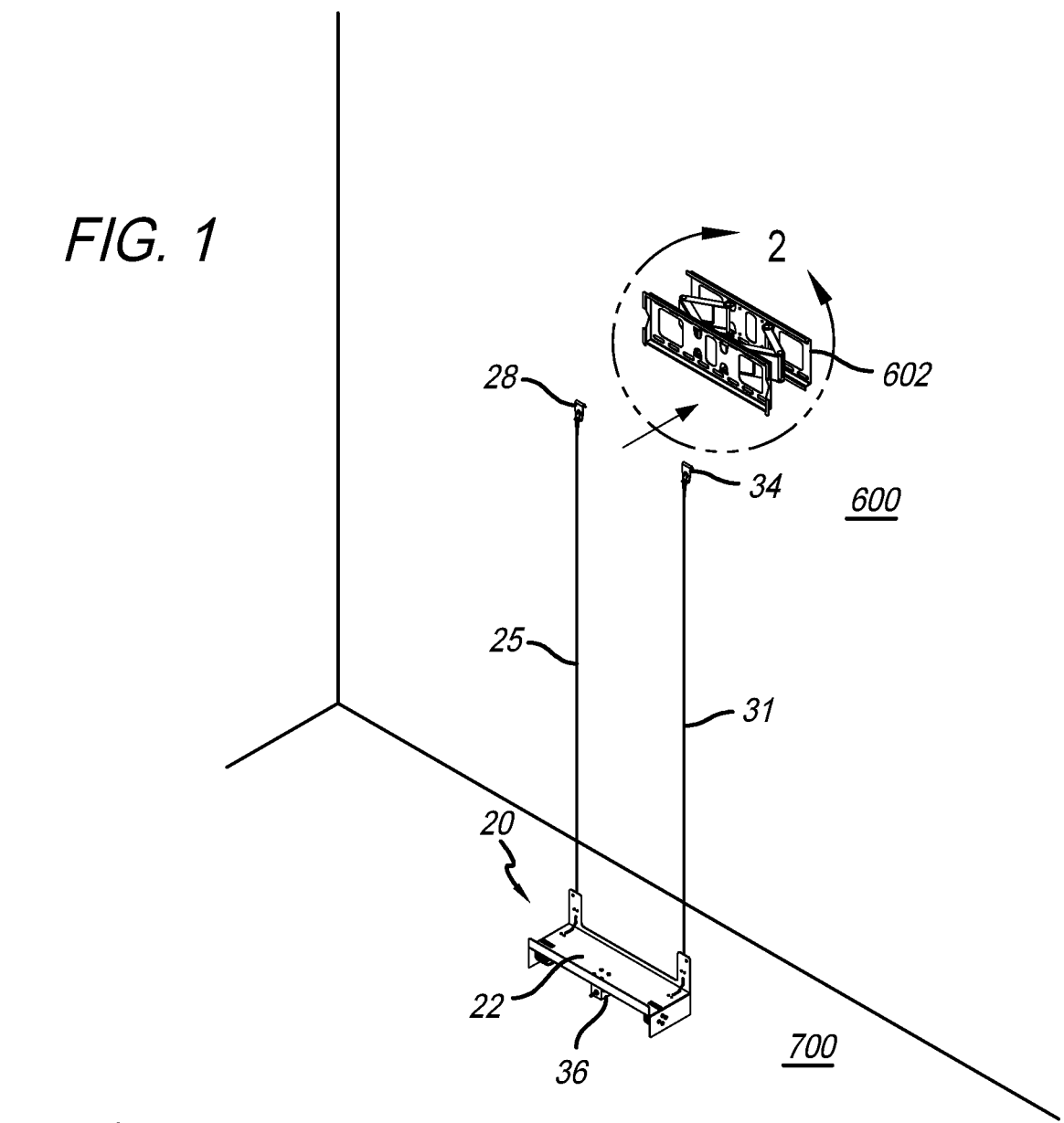
FIG. 1 is a reduced perspective view of an installation and removal tool for a wall-mounted wall-mountable object ready to be connected to a wall mount.
Figure 2:
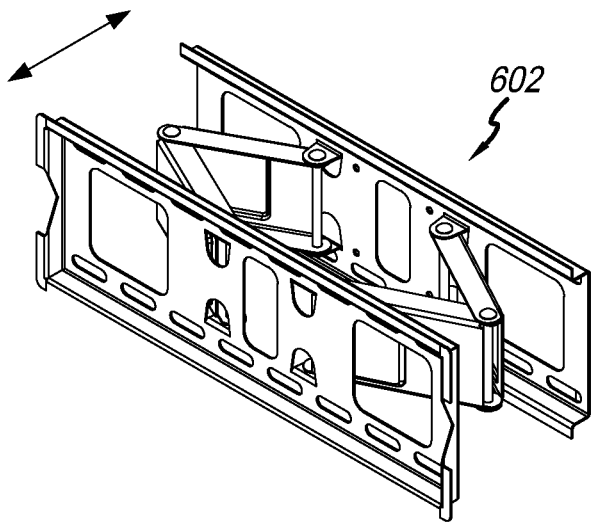
FIG. 2 is an enlarged view of area 2 of FIG. 1.

Referring initially to FIGS. 1-13 there are illustrated several views of an installation and removal tool for a wall-mountable object 500, the installation and removal tool generally designated as 20. As used herein the term "wall-mountable object" can include any object which can be mounted to an upstanding wall. Such wall-mountable objects include electronic displays (computer displays, TV displays, and the like which receive and display electronic images), mirrors, pictures, photographs, bulletin boards, status boards, white boards and other substantially flat items. However the principles of the present invention can also be applied to other wall-mountable objects such as works of art and decorative objects. Installation tool 20 is used to facilitate the connection of the wall-mountable object 500 (refer to FIG. 14-21) to a wall mount 602, the wall mount being connected to a wall 600 which upwardly projects from a support surface 700 (such as a floor). In the shown embodiment, wall-mountable object 500 is a TV display and wall mount 602 is articulated so that it can move away from and toward wall 600 (refer to arrows in FIG. 2). Also, it may be appreciated that different types of wall mounts 602 could also be utilized in the shown or other embodiments. For example, if the wall-mountable object 500 is a picture or mirror the wall mount might be a screw, a bolt, a nail, a bracket, a hanger, or any other connector which can attach to a wall 600 and support the weight of wall-mountable object 500.

Installation and removal tool 20 includes a holder 22 which is configured to receive wall-mountable object (refer also to FIGS. 16-17). Holder 22 can be of different sizes and shapes to accommodate different wall-mountable objects. In an embodiment holder 22 may be padded so as to protect the wall-mountable object 500 from marring. A first cable spool 24 is connected to holder 22, a first cable 25 is windable around first cable spool 24, first cable 25 having a distal end 26 (refer to FIGS. 3 and 4), a first connector is 28 disposed at distal end 26 of first cable 25, first connector 28 is removably connectable the wall mount 602. It is noted in FIGS. 3-9 and 11 that first cable 25 is in a retracted position wherein it is wound (wrapped) around first cable spool 24. A second cable spool 30 is connected to holder 22, a second cable 31 is wound around second cable spool 30, second cable 31 having a distal end 32 (refer to FIGS. 3 and 4), a second connector 34 is disposed at distal end 32 of second cable 31. Second connector 34 is removably connectable to the wall mount 602. It is noted in FIGS. 3-9 and 11 that second cable 31 is in a retracted position wherein it is wound around second cable spool 30.

Figure 3:
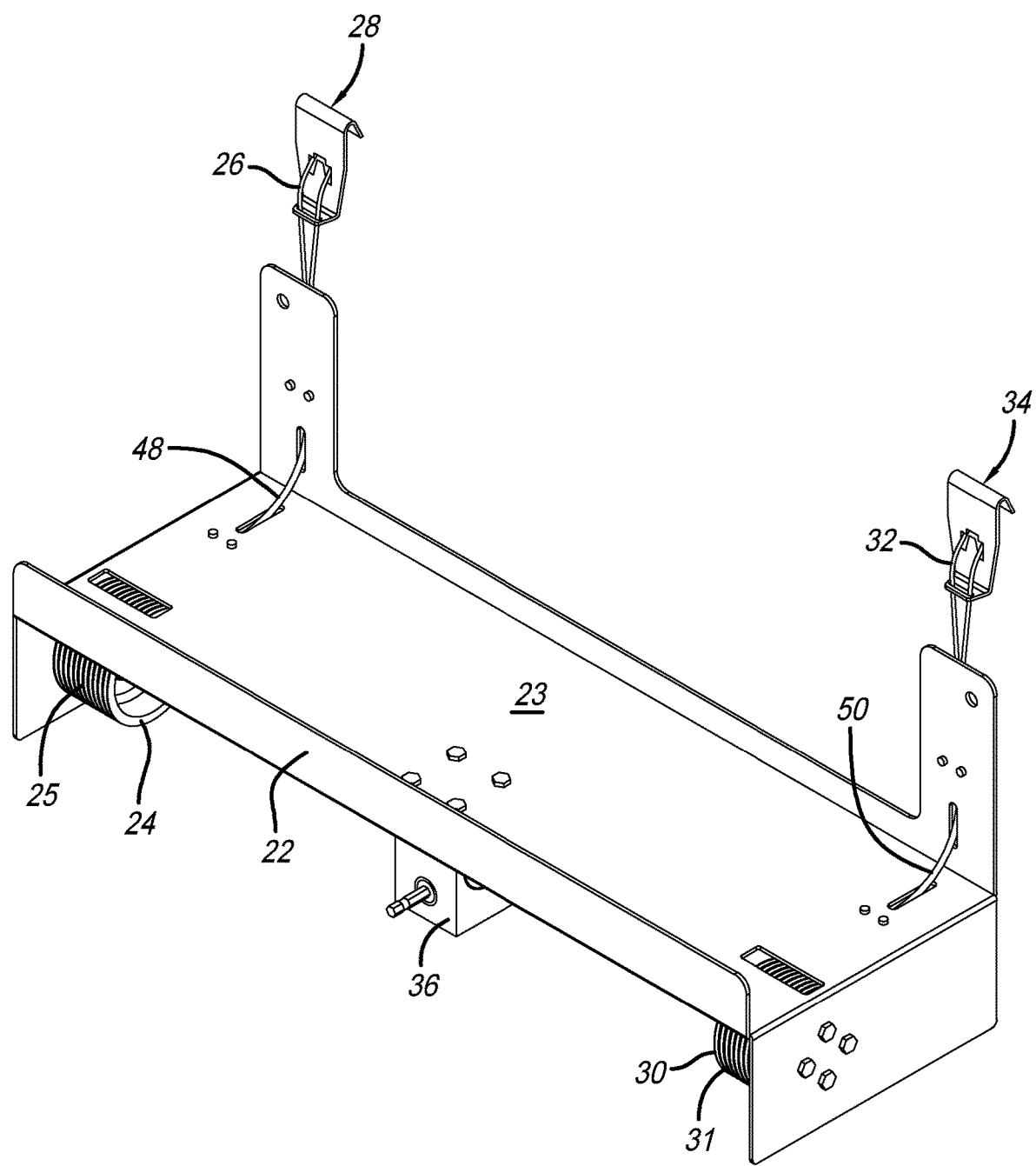
FIG. 3 is a front top perspective view of the installation and removal tool.
Figure 4:
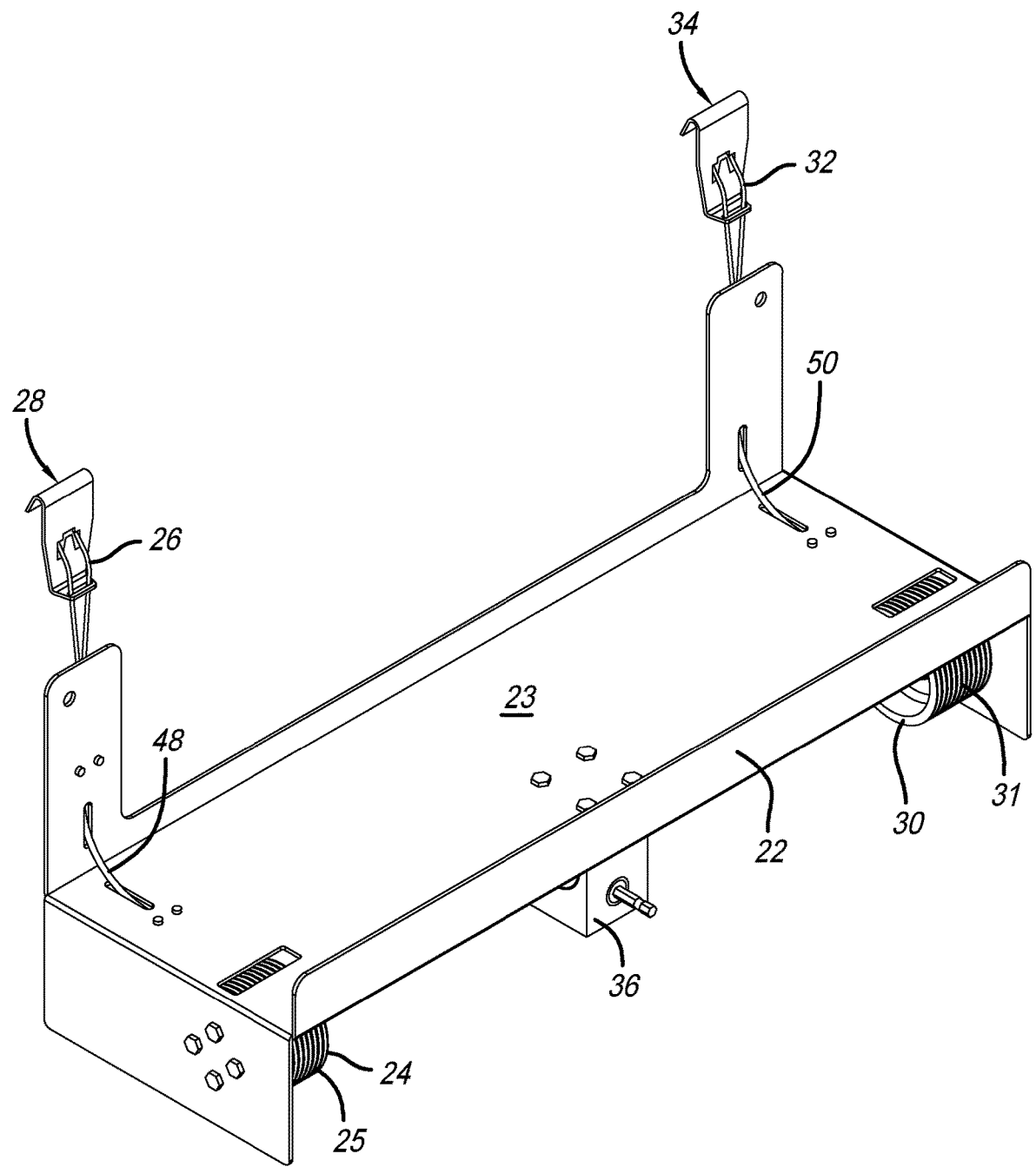
FIG. 4 is an opposite front top perspective view of the installation and removal tool.

Referring to FIGS. 3 and 4 it is noted that first connector 28 includes both a first hook which hooks over wall mount 602 and a first loop which can be used to loop over a different wall mount such as a nail. Similarly second connector 34 includes both a second hook which hooks over wall mount 602 and a second loop which can be used to loop over a different wall mount such as a nail. It may be appreciated that other types of connectors could also be utilized so long as they can effect connection to wall mount 602.

Figure 5:
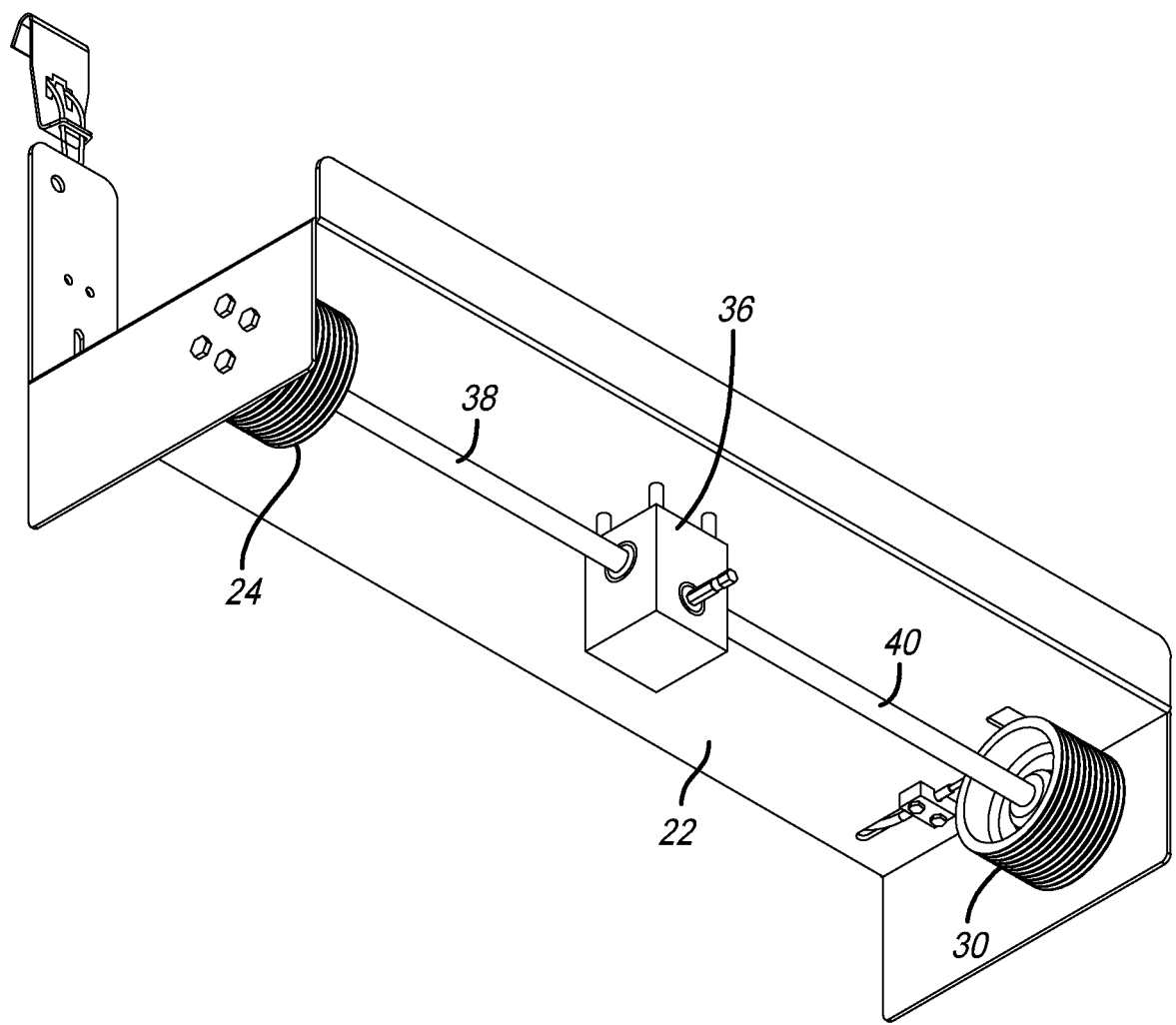
FIG. 5 is a bottom perspective4 view of the installation and removal tool.
Figure 8:
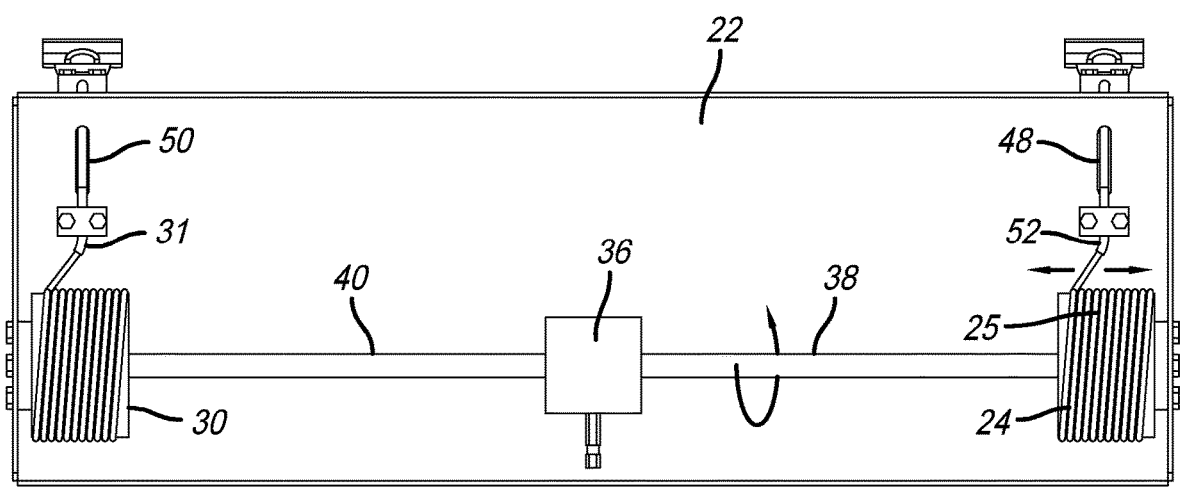
FIG. 8 is a bottom plan view of the installation and removal tool.
Figure 9:
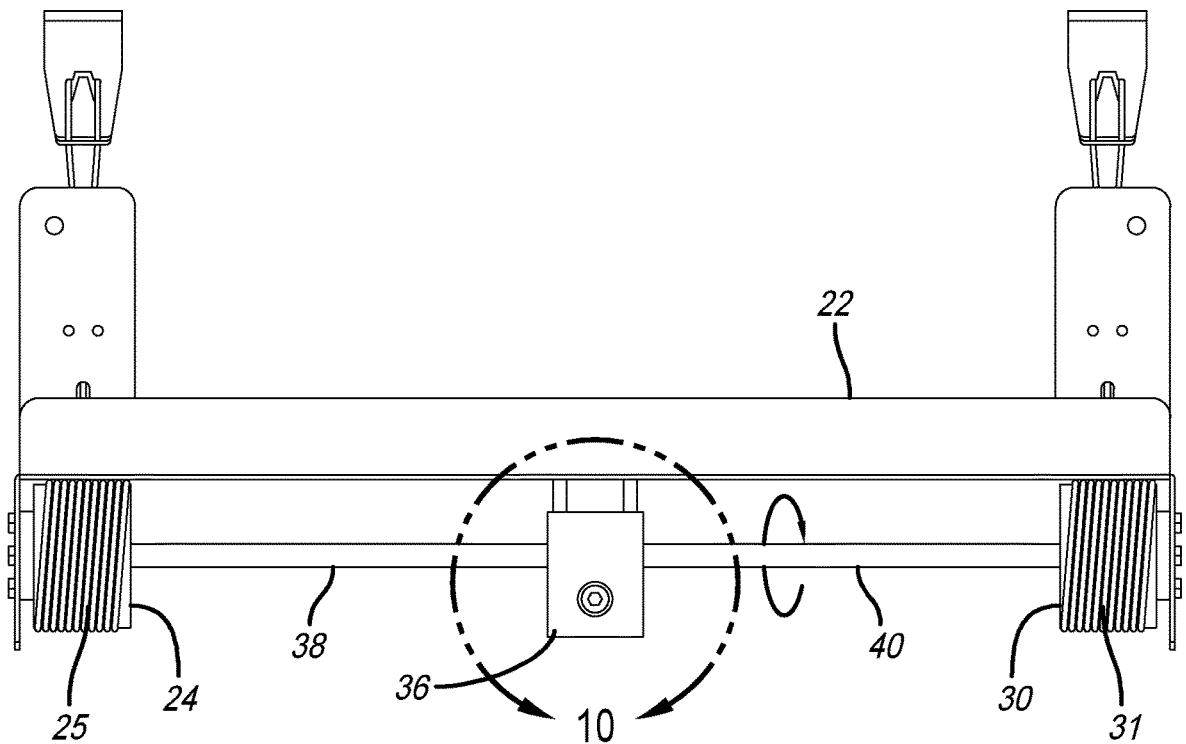
FIG. 9 is a front elevation view of the installation and removal tool.
Figure 10:
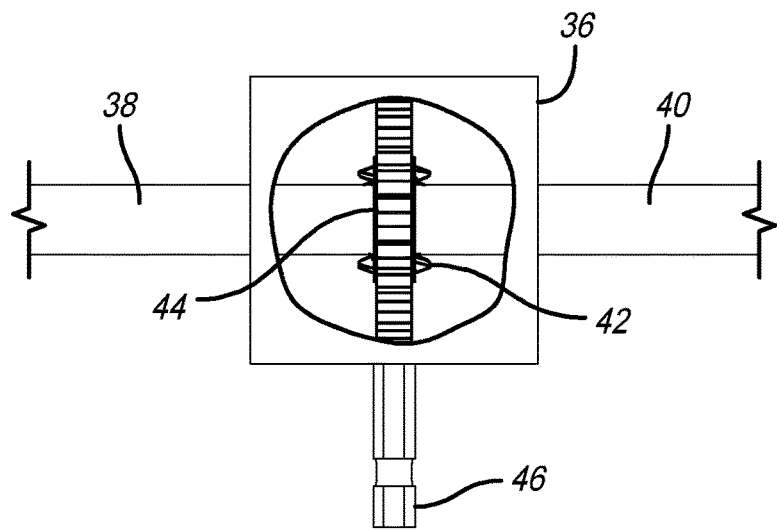
FIG. 10 is an enlarged top cutaway view of area 10 of FIG. 9.
Figure 11:
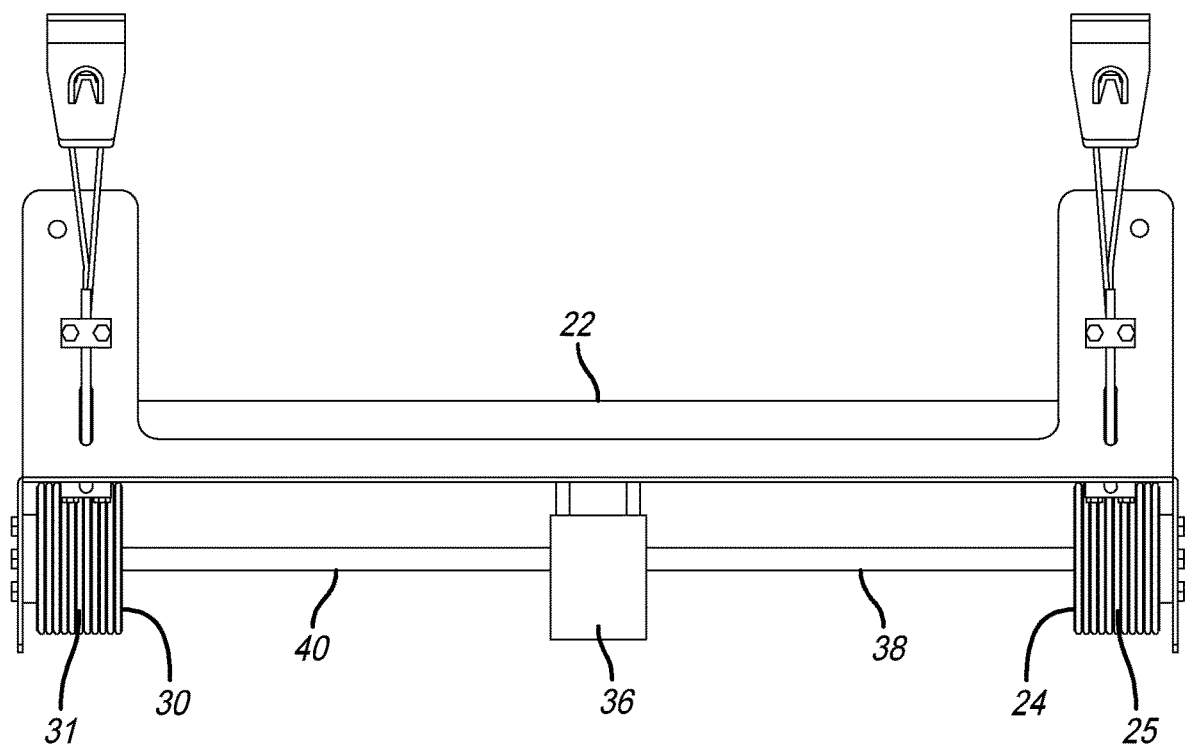
FIG. 11 is a rear elevation view of the installation and removal tool.
Figure 12:
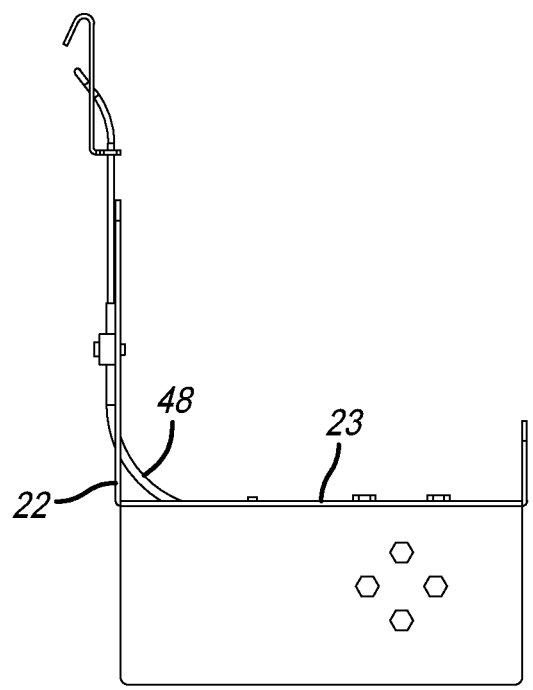
FIG. 12 is a side elevation view of the installation and removal tool.
Figure 13:
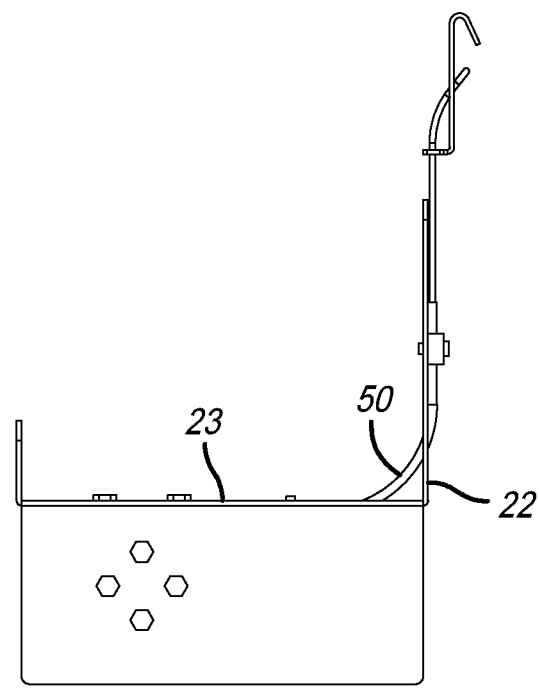
FIG. 13 is an opposite side elevation view of the installation and removal tool.

Installation and removal tool 20 further includes a rotary drive 36 which is connected to holder 22 and is used to raise holder 22. Referring to FIGS. 5, 8, and 10, a first axle 38 is connected between rotary drive 36 and first cable spool 24, and a second axle 40 is connected between rotary drive 36 and second cable spool 30. Activating rotary drive 36 causes first axle 38 and second axle 40 to rotate, thereby causing first cable spool 24 and second cable spool 30 to rotate thereby winding or unwinding first cable 25 and second cable 31. In FIGS. 8 and 9 arrows show the direction of rotation of first axle 38 and second axle 40 when cable is unwinding from the cable spools. Winding occurs in the opposite direction. Referring to FIG. 10, in the shown embodiment rotary drive 36 includes a worm gear 42 which engages both first axle 38 and said second axle 40 via a worm wheel 44. Worm gear 42 has a rotary head 46 which can be turned by a rotary device 800 such as by a drill motor (refer to FIGS. 18-21). Worm gear 42 turns worm wheel 44 which in turn rotates first axle 38 and second axle 40 and therefore first cable spool 24 and second cable spool 30. The cable spools take up or payout first cable 25 and second cable 31 and move holder 22 up and down.

Referring now to FIGS. 3, 8, 12, and 13, a first tubular cable guide 48 is connected to holder 22. First cable 25 is received by first tubular cable guide 48. That is, first tubular cable guide 48 serves as a sleave to house and direct first cable 25. Similarly, a second tubular cable guide 50 is connected to holder 22. Second cable 31 is received by second tubular cable guide 50. First tubular cable guide 48 and second tubular cable guide 50 are each curved and both form a 90° arc.

Referring to FIG. 8, it is noted that first tubular cable guide 48 has a first proximal end 52 which is connected to holder 22 adjacent first cable spool 24. In the shown embodiment first proximal end 52 includes a first flexible nipple. Similarly, second tubular cable guide 50 has a second proximal end 54 which is connected to holder 22 adjacent second cable spool 30. In the shown embodiment second proximal end 54 includes a second flexible nipple. As cable is wound or unwound about the cable spools the flexible nipples move (see small arrows) laterally to follow the cable's location on the cable spools.

Figure 7:
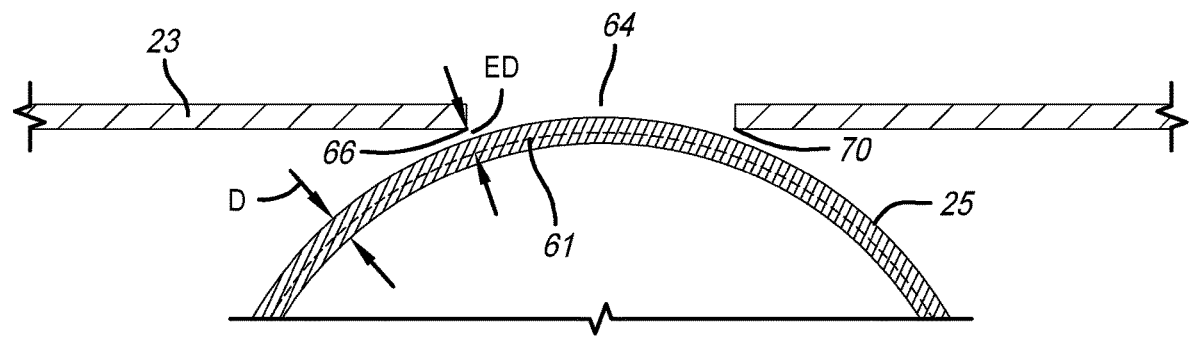
FIG. 7 is an enlarged cross sectional view along the line 7-7 of FIG. 6.
Figure 7A:
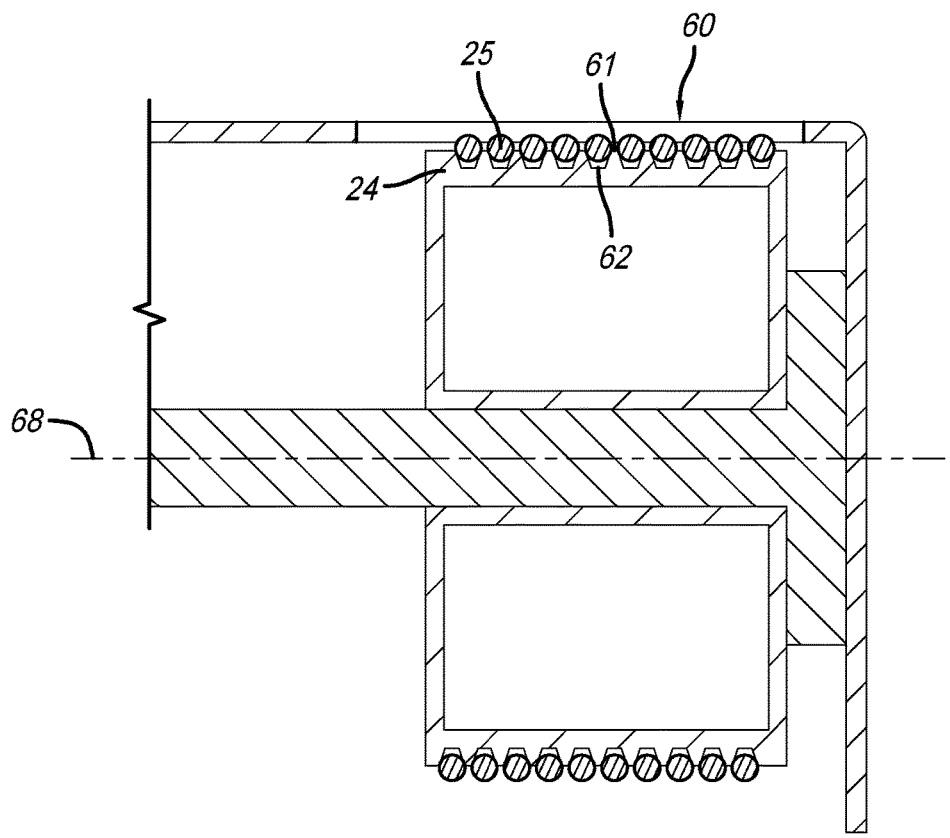
FIG. 7A is an enlarged cross sectional view along the line 7A-7A of FIG. 6.
Figure 7B:
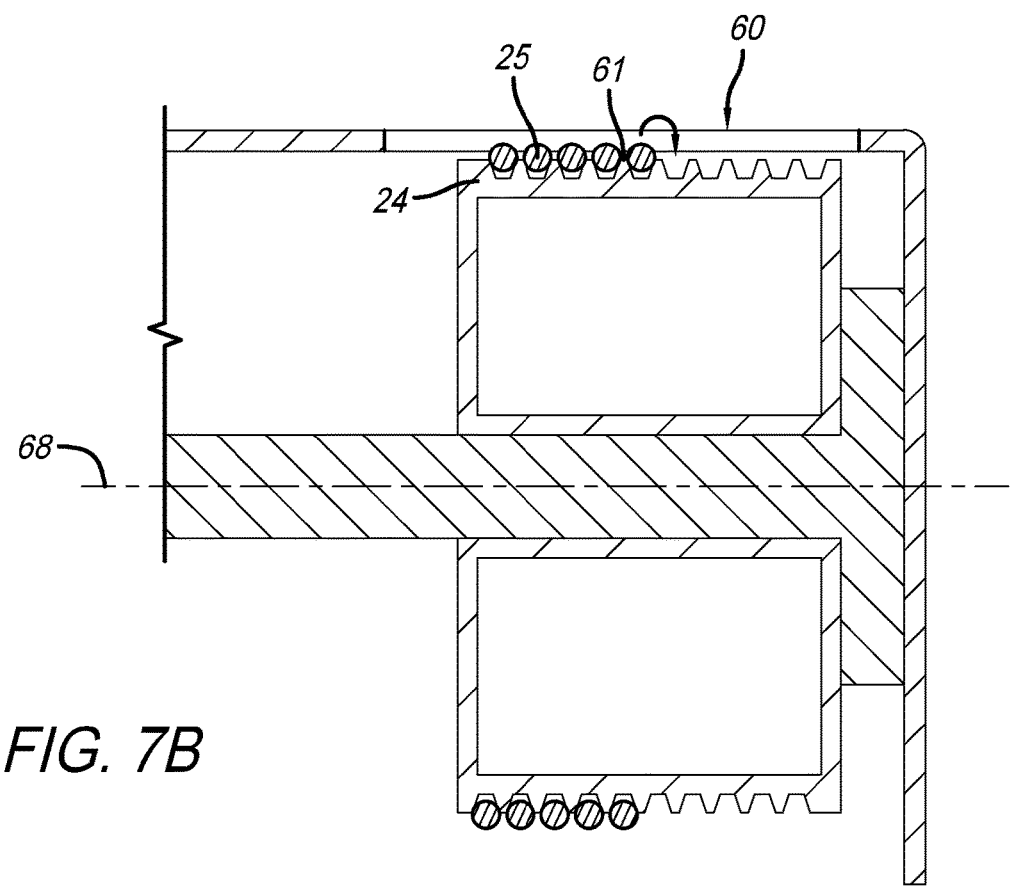
FIG. 7B is a second enlarged cross sectional view as in FIG. 7A.

Referring now to FIGS. 7A, and 7B, it is noted that first cable spool 24 includes a first helical groove 60 which receives first cable 25, first helical groove 60 includes a first plurality of alternating peaks 61 and valleys 62. First cable 25 is received by helical groove 60 which extends the entire width of first cable spool 24. Only one layer of first cable 25 winds around first cable spool 24. It is further noted that holder 22 has a bed 23 upon which wall-mountable object 500 rests (refer also to FIGS. 12 and 13). Bed 23 has a first aperture 64 which is disposed adjacent (above) first cable spool 24 and allows visual access thereof. That is a user can see first cable 25 as it winds and unwinds from first cable spool 24.

Figure 6:
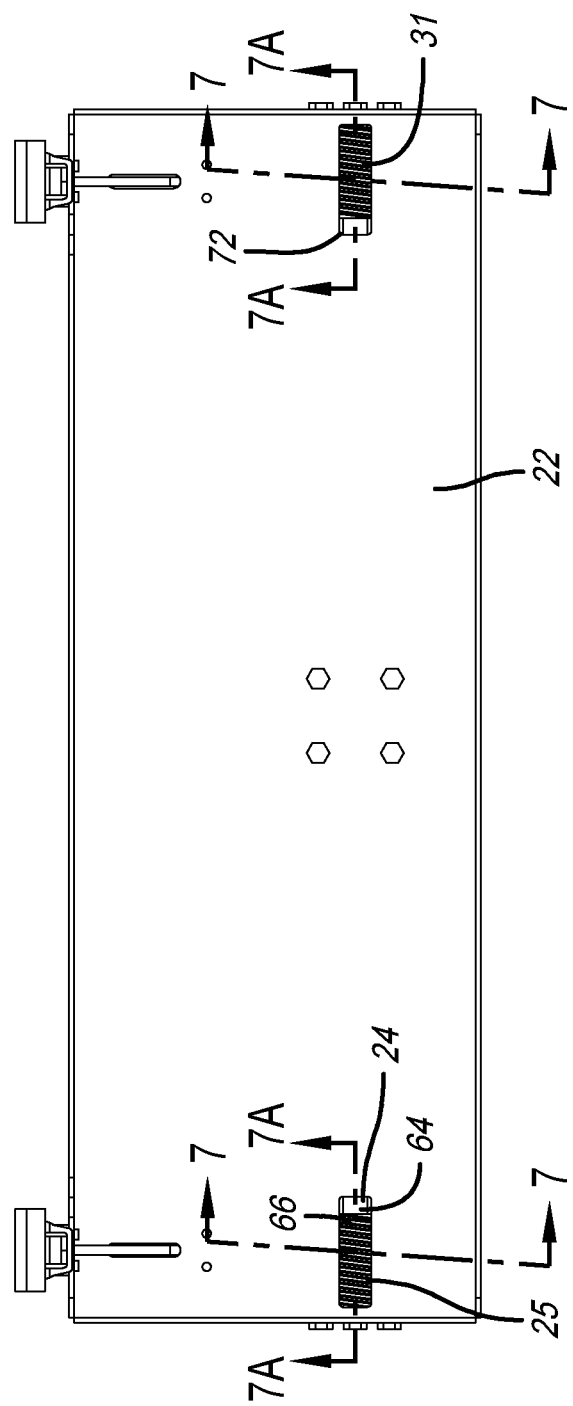
FIG. 6 is a top plan view of the installation and removal tool.

Referring to FIGS. 6 and 7, bed 23 includes a first lower axial edge 66 which borders first aperture 64. First lower axial edge 66 is parallel with first spool axis of rotation 68, and resides on the bottom surface of bed 23. Referring to FIGS. 7 and 10. lower axial edge 66 of first aperture 64 is positioned with respect to first cable spool 24 so that first cable 25 is prevented from axially moving across a peak 61 and into an adjacent valley 62. In other words, lower axial edge 66 confines first cable 25 within a portion of helical groove 60, and will not let first cable 25 jump to an adjacent portion of helical groove 60. This ensures that first cable 25 will be evenly wound around first cable spool 24. To accomplish this, lower axial edge 66 must be positioned an edge distance ED from a peak 61 which is less than the diameter D of first cable 25. That way, first cable 25 is prevented from crossing over a peak 61 because the gap between axial edge 66 and peak 61 too small for first cable 25 to pass. Referring to FIG. 7B, first cable 25 cannot take the path of the curved arrow and jump over peak 61. It is noted that edge distance ED is measured along a radial line between lower axial edge 66 and axis of rotation 68 of first cable spool 24. And, in the shown embodiment, first cable 25 upwardly projects (in the direction of the arrow) into first aperture 64 (refer to FIG. 7). That is, first cable 25 upwardly extends above the bottom surface of bed 23 and into first aperture 64.

It is further noted that first aperture 64 has an opposite axial edge 70 (refer to FIG. 7) which can be similarly positioned with respect to first cable spool 24 to provide the same effect as described above for first axial edge 66. It is also noted that bed 23 also includes a second aperture 72 (refer to FIG. 6). All of the previously described features of first aperture 64 and its relationship to first cable spool 24 and first cable 25 are also present in second aperture 72 and its relationship to second cable spool 30 and second cable 31.

Figure 15:
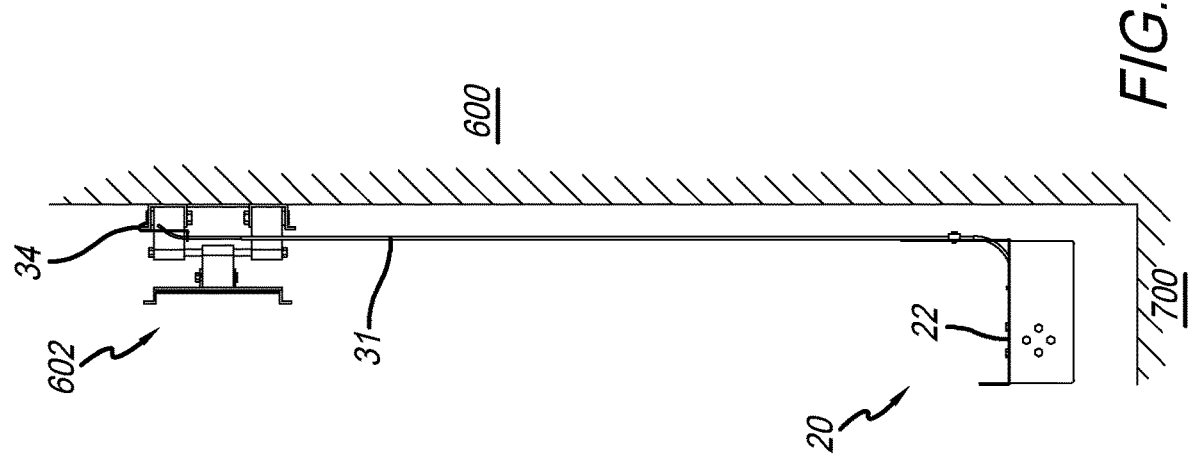
FIG. 15 is a side elevation view of FIG. 14.
Figure 14:
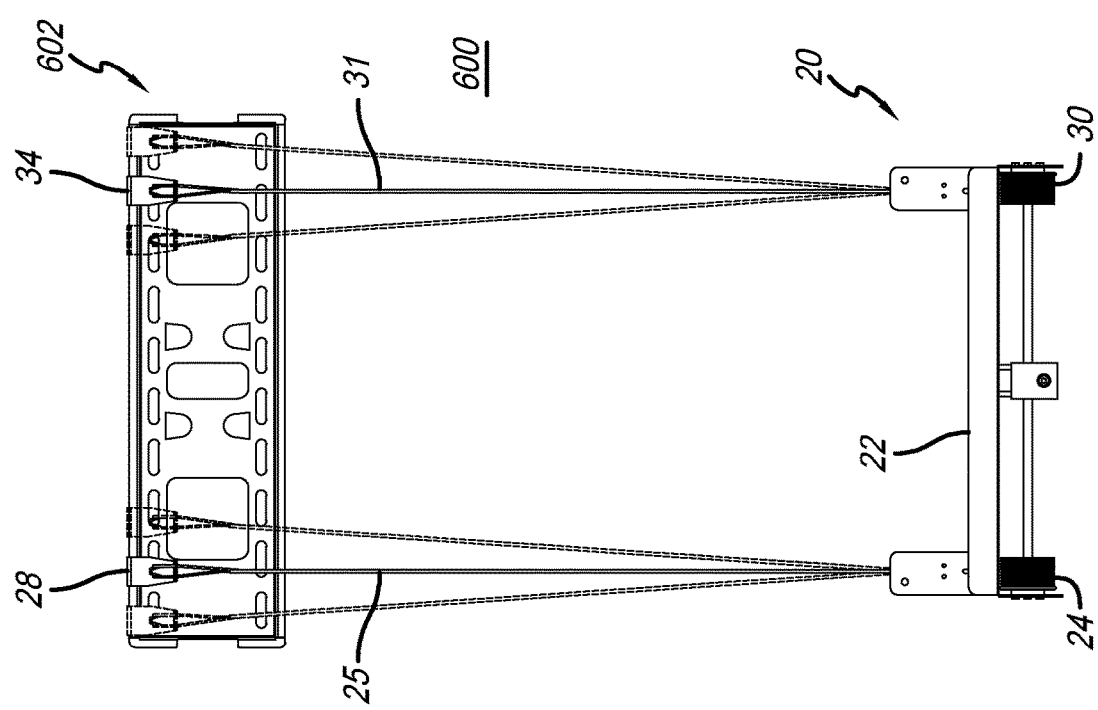
FIG. 14 is a reduced front elevation view of the installation and removal tool connected to a wall mount ready to be used.

FIGS. 14-21 show the steps of the using installation and removal tool 20 to install wall-mountable object 500 on wall 600. FIG. 14 is a front elevation view of the installation tool 20 connected to wall mount 602 (connected to a wall 600) ready to be used, and FIG. 15 is a side elevation view of FIG. 14. First connector 28 and second connector 34 have been connected to wall mount 602. In the shown embodiment, holder 22 hangs from first cable 25 and second cable 31 above support surface 700, with the weight of holder 22 and wall-mountable object 500 (see FIGS. 16-17) being borne by wall mount 602. However in another embodiment holder 22 could initially rest upon support surface 700. In the shown embodiment It is noted that almost all of first cable 25 and second cable 31 are unwound from their respective cable spools (first cable spool 24 and second cable spool 30). However in another embodiment, the cables can be longer and therefore more cable will be left on the spools. It is also noted that the placement of first connector 28 and second connector 34 on wall mount 602 can either be vertical as shown, or angled inward or outward as shown in dotted lines. An outward angle increases the stability of holder 22. Installation tool 20 is in a ready for use configuration ready to accept a wall-mountable object 500 as is depicted in FIGS. 16 and 17.

FIG. 16 is a front elevation view of the installation and removal tool 20 with wall-mountable object 500 inserted (loaded) into holder 22, and FIG. 17 is a side elevation view of FIG. 16. In the shown embodiment wall-mountable object 500 is TV display, however other objects are also possible as previously discussed. The bottom of wall-mountable object 500 rests in holder 22; It is noted that wall-mountable object 500 includes a wall-mountable object connector 502 which is disposed on its rear side, and is configured to engage wall mount 502 and hold wall-mountable object 500 in place on wall mount 602. In the shown embodiment wall-mountable object connector 502 is a hook which hooks over wall mount 602. However it may be appreciated that wall-mountable object connector 502 can take other forms in other embodiments such as a wire, a bracket, a clamp, s screw or any other connector which can connect to a particular wall mount 602. For example, if wall-mountable object 500 is a picture, wall-mountable object connector 502 could be a span of wire which hangs on a nail or screw on wall 600. Also, it is noted that first cable 25 and second cable 31 are still in their fully extended unwound positions.

FIG. 18 is a front elevation view of the installation and removal tool 20 with wall-mountable object 500 raised to a midway position toward wall mount 602, and FIG. 19 is a side elevation view of FIG. 18. It is observed that wall-mountable object 500 must be moved up so that wall-mountable object connector 502 can engage wall mount 602. In FIGS. 18 and 19 holder 22 and wall-mountable object 500 have been moved up approximately halfway toward wall mount 602. The upward movement is effected by applying a rotary device 800 such as a drill motor to rotary head 46 of rotary drive 36 (refer to FIG. 10). The rotary drive 36 causes first cable spool 24 and second cable spool 30 to turn and wind first cable 25 and second cable 31 around their respective spools. The winding causes holder 22 with wall-mountable object 500 to move upward. In an embodiment the rotary device is a locking rotary device 800 (also known as an impact driver) which locks to rotary head 46 of rotary drive 36. This enables locking rotary device 800 to be used as a handle to guide holder 22 and wall-mountable object 500 as they move up or down.

FIG. 20 is a front elevation view of the installation and removal tool 20 with wall-mountable object 500 raised to a fully elevated position and connected to wall mount 602, and, FIG. 21 is a side elevation view of FIG. 20. From the position of FIGS. 18 and 19, rotary power source 800 has continued to turn rotary drive 36 and first cable spoon 24 and second cable spool 30 thereby further winding first cable 25 and second cable 31 around their respective spools. The winding and raising has continued until wall-mountable object connector 502 is adjacent to wall mount 602, and is then connected to wall mount 602. After the connection, the installation and removal tool 20 can then be removed by disconnecting the cable connectors from wall mount 602.

In terms of use, an installation method includes (refer to FIGS. 1-21)
(a) providing a wall-mountable object 500 having a weight;
(b) providing a wall 600;
(c) providing a wall mount 602 which is connectable to the wall 600, the wall-mountable object 500 connectable to the wall mount 602;
(d) providing an installation and removal tool 20 for the wall-mountable object 500 including;
a holder 22 which is configured to receive the wall-mountable object 500;
a first cable spool 24 connected to the holder 22, a first cable 25 windable around the first cable spool 24, the first cable 25 having a distal end 26, a first connector 28 disposed at the distal end 25 of the first cable 31, the first connector 28 removably connectable to the wall mount 602;
a second cable spool 30 connected to the holder 22, a second cable 31 windable around the second cable spool 30, the second cable 31 having a distal end, 32 a second connector 34 disposed at the distal end 32 of the second cable 31, the second connector 34 removably connectable to the wall mount 602;
a rotary drive 36 connected to the holder 22;
a first axle 38 connected between the rotary drive 36 and the first cable spool 24;
a second axle 40 connected between the rotary drive 36 and the second cable spool 30;
(e) connecting the wall mount 602 to the wall 600;
(f) connecting the first connector 28 and the second connector 34 to the wall mount 602;
(g) placing the wall-mountable object 500 in the holder 22;
(h) causing the holder 22 with wall-mountable object 500 to move upward to a position adjacent to the wall mount 602; and,
(i) connecting the wall-mountable object 500 to the wall mount 602.

The method further including:
in (h), the weight of the wall-mountable object 500 being borne by the wall mount 602.

The method further including:
in (d), activating the rotary drive 36 causing the first cable 25 to wind (wrap) around the first cable spool 24, the second cable 31 to wind around the second cable pool 30, and the holder 22 with wall-mountable object 500 to rise.

The method further including:
in (d), the holder 22 having a bed 23;
in (d), the bed 23 having a first aperture 64, the first aperture 64 disposed adjacent the first cable spool 24 and allowing visual access thereof; and,
in *d), the bed 23 having a second aperture 72, the second aperture 72 disposed adjacent the second cable spool 30 and allowing visual access thereof.

The method further including:
in (d) providing a locking rotary device 800;
in (h) locking the locking rotary device 800 to the rotary drive 36;
in (h) using the locking rotary device 800 to turn the rotary drive 36; and,
in (h) using the locking rotary device 800 as a handle to guide the holder 22 and the wall-mountable object 500 as they move upward.

It may be appreciated that installation and removal tool 20 can also be used to remove a wall-mounted object 500 from a wall 600. To do so, the above-cited process is essentially reversed. First connector 28 and second connector 34 are connected to wall mount 602. Using rotary drive 36, holder 22 is then raised so that it receives and supports wall-mountable object 500. Wall-mountable object connector 502 is then disconnected from wall mount 602. Rotary drive 36 is then used to lower wall-mountable object 500. Wall-mountable object 500 is then removed from holder 22, and installation and removal tool 20 is disconnected from wall mount 602.

The embodiments of the installation and removal tool and method described herein are exemplary and numerous modifications, combinations, variations, and rearrangements can be readily envisioned to achieve an equivalent result, all of which are intended to be embraced within the scope of the appended claims. Further, nothing in the above-provided discussions of the installation and removal tool and method should be construed as limiting the invention to a particular embodiment or combination of embodiments. The scope of the invention is defined by the appended claims.

I claim:
1. An installation and removal tool for a wall-mountable object, the wall-mountable object connectable to a wall mount which is connected to a wall, the installation and removal tool comprising:
a holder;
a first cable spool connected to said holder, a first cable windable around said first cable spool, said first cable having a distal end, a first connector disposed at said distal end of said first cable, said first connector removably connectable to the wall mount;
a second cable spool connected to said holder, a second cable windable around said second cable spool, said second cable having a distal end, a second connector disposed at said distal end of said second cable; said second connector removably connectable to the wall mount;
a rotary drive connected to said holder;
a first axle connected between said rotary drive and said first cable spool;
a second axle connected between said rotary drive and said second cable spool;
said holder having a bed;
said bed having a first aperture, said first aperture disposed adjacent said first cable spool and allowing visual access thereof;
said bed having a second aperture, said second aperture disposed adjacent said second cable spool and allowing visual access thereof;
said bed including a first lower axial edge which borders said first aperture;
said first cable spool including a first helical groove which receives said first cable, said first helical groove including a first plurality of alternating peaks and valleys;
said first lower axial edge positioned with respect to said first cable spool so that said first cable is prevented from axially moving across a said peak and into an adjacent said valley;
said bed including a second lower axial edge which borders said second aperture;
said second cable spool including a second helical groove which receives said second cable, said second helical groove including a second plurality of alternating peaks and valleys; and,
said second lower axial edge positioned with respect to said second cable spool so that said second cable is prevented from axially moving across a said peak and into an adjacent said valley.

2. The installation and removal tool according to claim 1 further including:
a first tubular cable guide connected to said holder, said first cable received by said first tubular cable guide; and,
a second tubular cable guide connected to said holder, said second cable received by said second tubular cable guide.

3. The installation and removal tool according to claim 2 further including:
said first and second tubular cable guides both being curved.

4. The installation and removal tool according to claim 2 further including:
said first tubular cable guide having a first proximal end, said first proximal end connected to said holder adjacent said first cable spool, said first proximal end including a first flexible nipple; and,
said second tubular cable guide having a second proximal end, said second proximal end connected to said holder adjacent said second cable spool, said second proximal end including a second flexible nipple.

5. The installation and removal tool according to claim 1 further including:
said rotary drive including a worm gear which engages both said first axle and said second axle via a worm wheel.

6. The installation and removal tool according to claim 1 further including:
said first connector including both a first hook and a first loop; and,
said second connector including both a second hook and a second loop.

7. The installation and removal tool according to claim 1 further including:
a first tubular cable guide connected to said holder, said first cable received by said first tubular cable guide;
a second tubular cable guide connected to said holder, said second cable received by said second tubular cable guide;
said first and second tubular cable guides both being curved;
said first tubular cable guide having a first proximal end, said first proximal end connected to said holder adjacent said first cable spool, said first proximal end including a first flexible nipple;
said second tubular cable guide having a second proximal end, said second proximal end connected to said holder adjacent said second cable spool, said second proximal end including a second flexible nipple;
said rotary drive including a worm gear which engages both said first axle and said second axle via a worm wheel;
said first connector including both a first hook and a first loop; and,
said second connector including both a second hook and a second loop.

8. An instillation system comprising:
a wall-mountable object;
a wall mount connected to a wall, said wall-mountable object connectable to said wall mount;
an installation and removal tool for said wall-mountable object including;
a holder;
a first cable spool connected to said holder, a first cable windable around said first cable spool, said first cable having a distal end, a first connector disposed at said distal end of said first cable, said first connector removably connectable to said wall mount;
a second cable spool connected to said holder, a second cable windable around said second cable spool, said second cable having a distal end, a second connector disposed at said distal end of said second cable, said second connector removably connectable to said wall mount;
a rotary drive connected to said holder;
a first axle connected between said rotary drive and said first cable spool;
a second axle connected between said rotary drive and said second cable spool;
said holder having a bed;
said bed having a first aperture, said first aperture disposed adjacent said first cable spool and allowing visual access thereof;
said bed having a second aperture, said second aperture disposed adjacent said second cable spool and allowing visual access thereof;
said bed including a first lower axial edge which borders said first aperture;
said first cable spool including a first helical groove which receives said first cable, said first helical groove including a first plurality of alternating peaks and valleys;
said first lower axial edge positioned with respect to said first cable spool so that said first cable is prevented from axially moving across a said peak and into an adjacent said valley;
said bed including a second lower axial edge which borders said second aperture;
said second cable spool including a second helical groove which receives said second cable, said second helical groove including a second plurality of alternating peaks and valleys; and,
said second lower axial edge positioned with respect to said second cable spool so that said second cable is prevented from axially moving across a said peak and into an adjacent said valley.

9. The installation system according to claim 8 further including:
a first tubular cable guide connected to said holder, said first cable received by said first tubular cable guide; and,
a second tubular cable guide connected to said holder, said second cable received by said second tubular cable guide.

10. The installation system according to claim 9 further including:
said first and second tubular cable guides both being curved.

11. The installation system according to claim 9 further including:
said first tubular cable guide having a first proximal end, said first proximal end connected to said holder adjacent said first cable spool, said first proximal end including a first flexible nipple; and,
said second tubular cable guide having a second proximal end, said second proximal end connected to said holder adjacent said second cable spool, said second proximal end including a second flexible nipple.

12. The installation system according to claim 8 further including:

said rotary drive including a worm gear which engages both said first axle and said second axle.

13. The installation system according to claim 8 further including:
said first connector including both a first hook and a first loop; and,
said second connector including both a second hook and a second loop.

14. An installation method comprising:
(a) providing a wall-mountable object having a weight;
(b) providing a wall;
(c) providing a wall mount which is connectable to said wall, said wall-mountable object connectable to said wall mount;
(d) providing an installation and removal tool for said wall-mountable object including;
a holder;
a first cable spool connected to said holder, a first cable windable around said first cable spool, said first cable having a distal end, a first connector disposed at said distal end of said first cable, said first connector removably connectable to said wall mount;
a second cable spool connected to said holder, a second cable windable around said second cable spool, said second cable having a distal end, a second connector disposed at said distal end of said second cable, said second connector removably connectable to said wall mount;
a rotary drive connected to said holder;
a first axle connected between said rotary drive and said first cable spool;
a second axle connected between said rotary drive and said second cable spool;
said holder having a bed;
said bed having a first aperture, said first aperture disposed adjacent said first cable spool and allowing visual access thereof;
said bed having a second aperture, said second aperture disposed adjacent-said second cable spool and allowing visual access thereof;
said bed including a first lower axial edge which borders said first aperture;
said first cable spool including a first helical groove which receives said first cable, said first helical groove including a first plurality of alternating peaks and valleys;
said first lower axial edge positioned with respect to said first cable spool so that said first cable is prevented from axially moving across a said peak and into an adjacent said valley;
said bed including a second lower axial edge which borders said second aperture;
said second cable spool including a second helical groove which receives said second cable, said second helical groove including a second plurality of alternating peaks and valleys; and,
said second lower axial edge positioned with respect to said second cable spool so that said second cable is prevented from axially moving across a said peak and into an adjacent said valley,
(e) connecting said wall mount to said wall;
(f) connecting said first connector and said second connector to said wall mount;
(g) placing said holder with said wall-mountable object in said holder;
(h) causing said holder with said wall-mountable object to move upward to a position adjacent to said wall mount; and,
(i) connecting said wall-mountable object to said wall mount.

15. The method of claim 14 further including:
in (h), said weight of said wall-mountable object being borne by said wall mount.

16. The method of claim 14 further including:
in (d), activating said rotary drive causing said first cable to wind around said first cable spool, said second cable to wind around said second cable spool, and said holder with said wall-mountable object to rise.

17. The method of claim 14 further including:
in (d) providing a locking rotary device;
in (h) locking said locking rotary device to said rotary drive;
in (h) using said locking rotary device to turn said rotary drive; and,
in (h) using said locking rotary device as a handle to guide said holder and said wall-mountable object as they move upward.

\* \* \* \* \*